A. OLSON.
DISK PLOW.
APPLICATION FILED JAN. 30, 1912.

1,036,140.

Patented Aug. 20, 1912.
2 SHEETS—SHEET 1.

WITNESSES:

Arvill Olson
INVENTOR

BY
Attorney

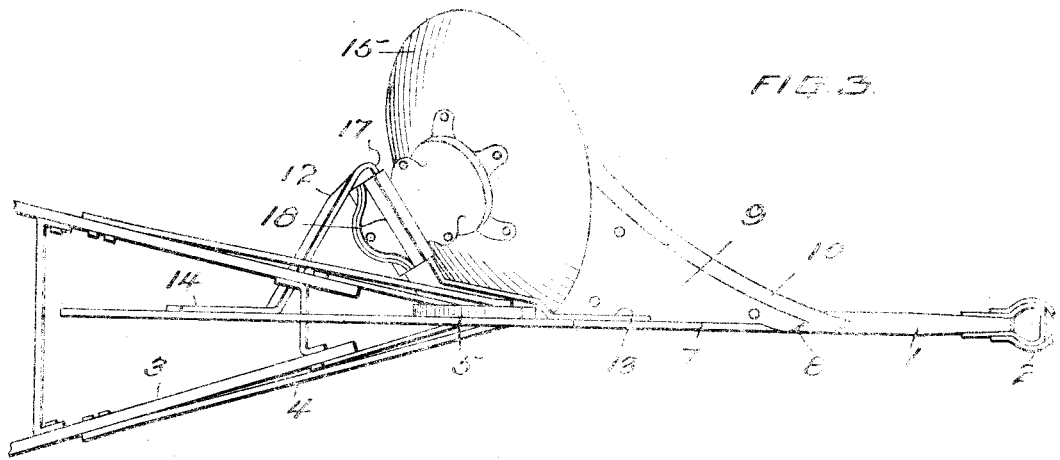
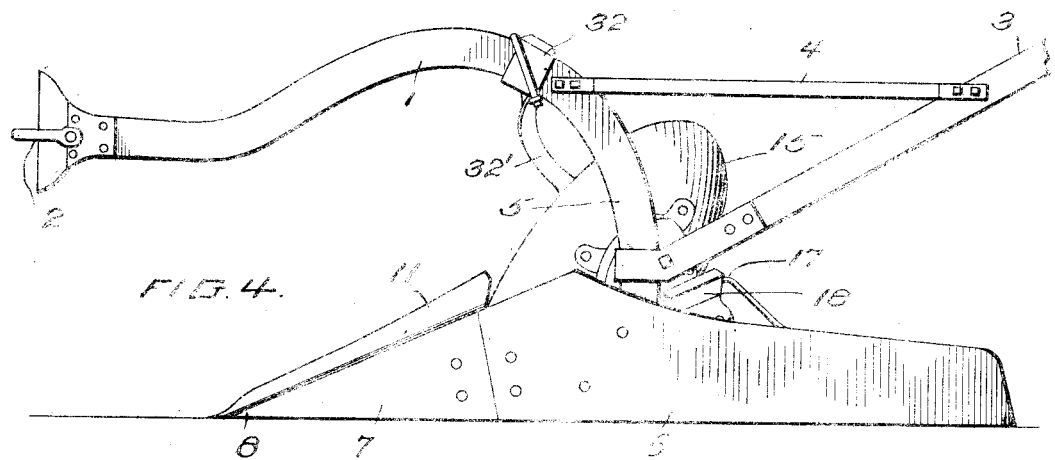
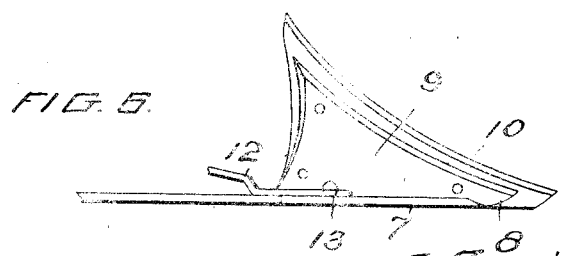

UNITED STATES PATENT OFFICE.

ARVILL OLSON, OF VERNON, UTAH.

DISK PLOW.

1,036,140.

Specification of Letters Patent. Patented Aug. 20, 1912.

Application filed January 30, 1912. Serial No. 674,292.

*To all whom it may concern:*

Be it known that I, ARVILL OLSON, a citizen of the United States, residing at Vernon, in the county of Tooele and State of Utah, have invented certain new and useful Improvements in Disk Plows, of which the following is a specification.

My invention relates to improvements in disk plows, and refers particularly to a plow provided with a plow point to open the soil and a revoluble disk arranged rearwardly of the point so as to cut and throw the furrow outward.

The principal object of the invention is to provide a plow of this character which will be thoroughly efficient and practical in operation; simple in construction, and inexpensive of production.

Another object of the invention is to provide a novel and simple form of disk bearing for the rotatable disk, which bearing will reduce the friction of the parts to a minimum and which will permit the adjustment of the disk with reference to the plow.

A further object of the invention is to provide means whereby the rotary disk may be secured to the landside direct and which fastening will prevent the plow from tipping over when in action, an objection of paramount importance which is prevalent in plows now in use.

To attain the desired objects, my invention broadly stated consists of a disk plow embodying novel features of construction and combination of parts for service substantially as disclosed herein.

Figure 1:
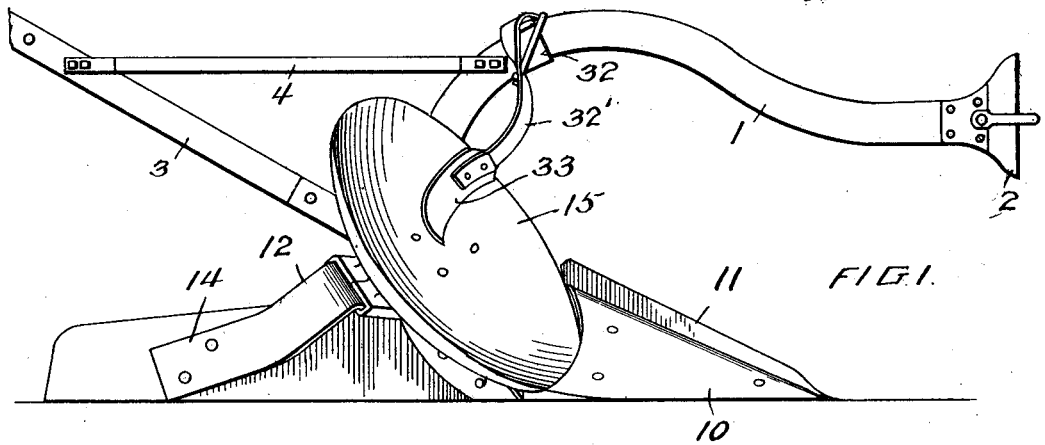
Figure 2:
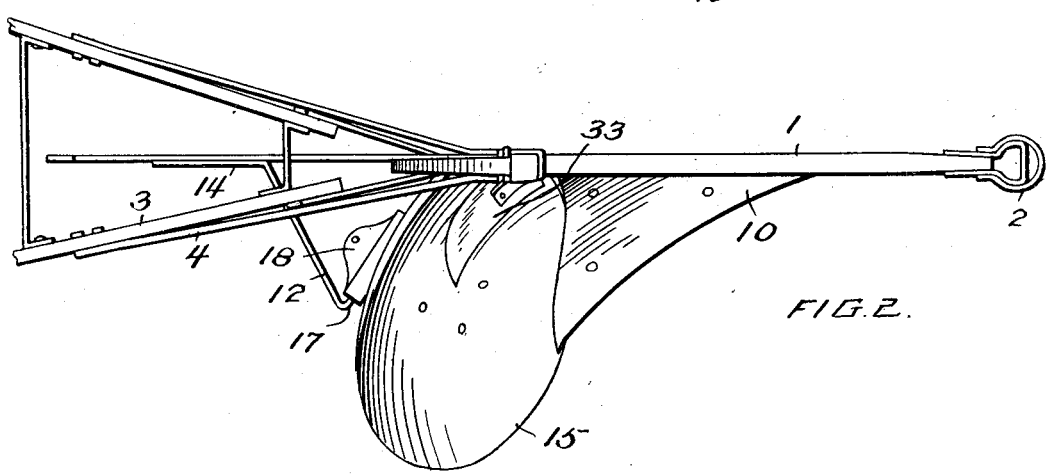
Figure 3:
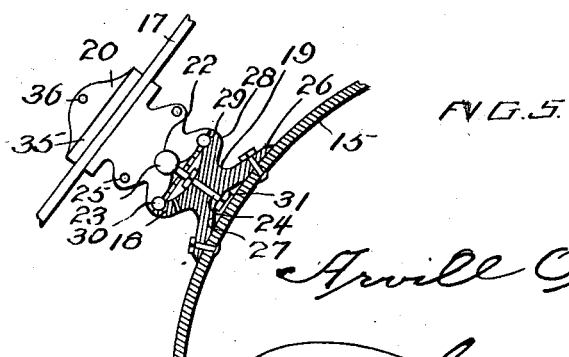

Figure 1 is a side view of the complete plow. Fig. 2 is a top plan view of the complete plow. Fig. 3 is a bottom plan view of the plow, and Fig. 4 is a side view of the plow. Fig. 5 is a vertical sectional view of the disk and bearing. Fig. 6 is a detail view.

In the drawings: The numeral 1 designates the plow beam, having the draft connection 2 at the forward end, 3 the handles and 4 the inclined brace rods between the handles and beam. The beam 1 is formed with a curved vertical standard 5 to which is secured the vertical landside 6. Immediately forward of the landside is the vertical plow share 7, having its forward end 8 pointed and having an inwardly projected wing 9 formed integral therewith, to which is secured the removable plow point 10, of triangular shape and provided with the vertical flange 11 at its upper inclined edge. The plow share is secured to the landside 6 by means of the angular bracket 12, which has its oppositely disposed ends bent to form the lateral arms or wings 13 and 14. These arms extend in a plane substantially parallel to that of the landside 6 and are secured to the forward and rear ends respectively of the landside, the plow share 7 being thus joined to the landside by the forward arm 13, which thus forms a rigid connection point between the forward end of the landside and the rear end of the plow point, and from this construction it will be noted that I provide a novel and extremely simple method of securing the plow share and landside together.

The numeral 15 designates the rotary disk which is disposed immediately in the rear of the plow point. The disk 15 is preferably concaved in shape and has its outer edge sharpened or milled. The disk 15 is rotatably secured to the forward inclined portion 17 of the angular bracket 12 by means of the connection member, designated generally by the numeral 18. This connection consists of an upper bracket 19 and a lower bracket 20. The lower bracket 20 is composed of two similar parts and has a central socket 22 in which is secured the ball bearing head 23 of the king bolt 24. The bracket is further provided with the oppositely disposed openings 25 through which bolts are passed to secure the two sections together. The upper bracket 19 consists of a pair of outspread lower feet 26 secured to the periphery of the disk 15 by suitable bolts, a centrally disposed socket 27 formed by said feet 26, and a pair of upper feet 28. By inspection of Fig. 5, it will be noted that a track or groove 29 is thus formed between the two members 19 and 20, in which is located the pair of oppositely disposed ball bearings 30, while the king bolt is secured in position by means of the pair of oppositely disposed nuts 31.

To provide means for adjusting the disk with respect to the plow, I provide each of the sections of the lower bracket 20 with an integrally formed portion 35, which is bent over the inclined arm 17 of the bracket 12 and forms a clamping sleeve or collar to engage said arm. These portions 35 are adjustably secured together by the bolt 36 and the member 18 may thus be moved along the inclined arm of the bracket and secured in any desired position. From this construction it will be noted that I provide a simple and inexpensive bearing for the rotary disk, which bearing is both adjustable and practically frictionless, owing to its anti-friction devices.

Secured to the plow beam 1 by the yoke clamp 32 is the spring arm 32', carrying the scraper or blade 33, which is concaved to accord with the concavity of the disk 15 and contacts with the face thereof to remove any deposit of soil which might adhere to and clog the disk. The spring arm holds the scraper close to the disk to remove the accumulation and will accommodate itself to the amount of dirt adhering to the disk.

From the foregoing description taken in connection with the drawings, it will be observed that I provide a plow which will be extremely simple of construction, inexpensive of production, and thoroughly practical and efficient from every point of view.

I claim:

1. In a disk plow, the combination with a plow beam, a landside connected thereto, a plow share, a plow point connected to said plow share, a rotary disk disposed rearwardly of the plow point, an inclined angular bracket formed with laterally extending arms secured to the landside, one of said arms joining the landside and plow share in position, and a mounting for the disk slidable upon one of the inclinations of the bracket.

2. In a disk plow, in combination with a landside, a disk, a plow, and a plow share, of an angular inclined bracket connected at each end to the landside one of said ends forming a rigid connecting means between the forward end of the landside and the rear end of the plow share, and an adjustable connection slidably secured upon the forward arm of the inclined bracket and uniting the bracket and disk.

3. In a disk plow, in combination, a landside, a disk, a plow share and a plow point, an angular inclined bracket connected at each end to the landside, a mounting for the disk adjustable upon the forward arm of said inclined bracket, said mounting comprising an upper and lower bracket secured together, the lower of said brackets being formed of two sections provided with offset portions to form a clamping sleeve, and means passing through openings in said offset portions to secure the clamping sleeve in adjusted position upon the forward arm of the bracket.

4. In a disk plow, the combination with a landside and a disk, of an angular inclined bracket secured to the landside and having converging arms, and a mounting for the disk adjustably secured upon one of the converging arms of said bracket.

5. In a disk plow, the combination with a landside a plow share, a plow point, and a disk, of a bracket formed with laterally extending arms secured to the landside and converging arms extending upwardly therefrom, one of said laterally extending arms forming a connection between the landside and the plow share, and a mounting for the disk adjustably secured upon one of the converging arms of said bracket.

In testimony whereof I affix my signature in presence of two witnesses.

ARVILL OLSON.

Witnesses:
J. A. EDWARDS,
A. S. ASH.